Patented July 26, 1927.

1,636,856

UNITED STATES PATENT OFFICE.

AUGUSTUS E. CRAVER, OF CLIFFSIDE, NEW JERSEY, ASSIGNOR TO THE BARRETT COMPANY, A CORPORATION OF NEW JERSEY.

PROCESS OF PRODUCING ANTHRAQUINONE.

No Drawing.    Application filed December 5, 1921.  Serial No. 520,142.

This invention relates to the catalytic oxidation of anthracene. It relates more specifically to improvements in the composition of catalysts for the partial oxidation of anthracene to anthraquinone.

I am aware that the catalytic vapor phase oxidation of anthracene to anthraquinone has been described before, but the following disclosure of my invention will make clear the improvements which I have effected in the catalyst over the previous processes.

In the German Patent No. 168,291 a process for the catalytic oxidation of anthracene to anthraquinone is described which depends for success on the admission of steam to the mixture of anthracene vapor and air before reaching the catalyst, which consists of vanadium oxide. The addition of steam is said to be necessary as it acts as a diluent, thus preventing explosions, and also tends to absorb the excess heat of formation.

In the U. S. Patent No. 1,303,168, a process is described, which claims the use of oxides of a metal of the 6th group of the periodic system. Mention is made in the specification of said patent to the effect that mixtures of oxides of the metals of the sixth group of the periodic system can be used without stating which ones or what proportions are best, or indicating that there are any differences in the effects of different mixtures, or that they differ from the individual metallic oxide catalysts in their catalytic effect.

In the catalytic oxidation of anthracene, the oxidation thereof may proceed according to the following equations:—

(1) 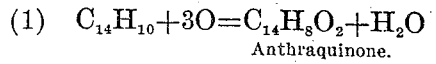
Anthraquinone.

(2) 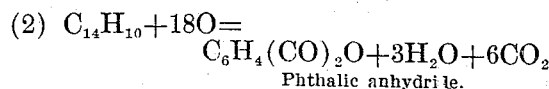
Phthalic anhydrile.

(3) 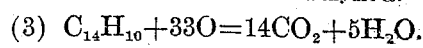

and depending on the catalyst employed, I have found these above three reactions occurring in varying proportions.

It is obvious that reactions (2) and (3) are to be avoided, if possible, or at least reduced to a minimum, as not only does the production of phthalic anhydride or the products of complete combustion represent a loss of anthracene, but it greatly increases the exotherm of the reaction, so that if the heat is not eliminated it will considerably augment the temperature of the catalyst and cause a still greater violence of the oxidation, which, depending on the catalyst employed, will give either more phthalic anhydride and complete combustion or only more complete combustion. To those acquainted with processes of catalytic oxidation it is a well known fact that satisfactory results can only be realized by maintaining a uniform temperature of the catalyst, and especially is this true if a hydrocarbon air mixture is employed in which the amount of available oxygen is considerably in excess of the theoretical requirement, which condition is highly desirable as will be explained below. This enormous increase in the exotherm, if the oxidation proceeds beyond the anthraquinone stage and the consequently increased difficulty of controlling the catalyst temperature at the desired and favorable temperature, can be better understood when the heat of reaction of the preceding three equations are compared. For example, in equation (1) the heat liberated, when one pound of anthracene reacts according to this equation, is only 1600 British thermal units, while in reaction (2) it is 9200, and in reaction (3) 17,300.

Therefore, a catalyst, which will cause the major portion of the reaction to progress only to the anthraquinone stage, is highly desirable as the heat liberated during the reaction will be quite small, thus making the control of the catalyst temperature relatively simple, and avoiding waste of valuable material.

I have found that the oxides of vanadium, when used as catalysts, will give fair yields of anthraquinone, but they also give a measurable production of phthalic anhydride and a very considerable complete combustion of the anthracene, and I have found that the temperature control of the catalyst is very difficult in that the catalyst temperature always tends to mount considerably above the optimum and desirable temperature. I have found that when the commercial production of anthraquinone by means of the oxides of vanadium is attempted, this difficulty of temperature control was considerably intensified over that encountered in a small scale production, and although the admission of steam was found to be of some benefit such large quantities had to be added as to interfere with the catalysis. Furthermore, it was found that such high temperatures as prevailed in the catalytic mass caused the vanadium oxides to undergo considerable depreciation. Thus the large phthalic anhydride production and complete combustion show that vanadium oxide, when used as a catalyst, causes the oxidation to go considerably beyond the anthraquinone stage.

It is a well known fact that vanadium oxide exerts a specific oxidizing action on a benzene nucleus whether it be present as such, as in benzene which gives maleic acid (see U. S. Patent No. 1,318,633), or in naphthalene from which I have obtained both phthalic anhydride and maleic acid in the ratio of 4.55 to 1.0 respectively, and I have similarly found that phenanthrene and acenaphthene both give phthalic and maleic acids. Thus the formation of intermediate oxidation products between anthraquinone and complete combustion might be expected since the oxidation of anthracene to phthalic anhydride is similar to the oxidation of napthhalene to maleic acid, as they both involve the complete spliting off of one benzene nucleus. I have also made a number of stability experiments in which a mixture of anthraquinone vapor and air was passed over the oxides of vanadium under conditions exactly similar to those employed in the oxidation of anthracene to anthraquinone and have found that anthraquinone undergoes considerable conversion into phthalic anhydride and the products of complete combustion. Thus it is seen that there is really insufficient difference between the ability of vanadium oxide to occasion the oxidation of anthracene to anthraquinone and its ability to cause the oxidation of anthraquinone to phthalic anhydride and complete combustion to make it a very satisfactory catalyst for the commercial production of anthraquinone.

In similar experiments I have found that molybdenum oxide, when used as a catalyst in the oxidation of anthracene, although it differs essentially from vanadium oxide in that the production of phthalic anhydride is practically absent, gives a measurable amount of anthraquinone, but only at excessively high catalyst temperatures. Even at temperatures approximately 550°-600° C., the yield of anthraquinone was relatively small and the excess combustion relatively high, the latter being undoubtedly due to the fact that anthracene undergoes pyrogenetic decomposition, as my work has shown that anthracene in the presence of air and high temperature is fairly unstable. This is a factor of considerable importance and must be reckoned with in discovering a catalyst for the commercial production of anthraquinone. The absence of phthalic anhydride formation is to be expected with molybdenum oxide since the production of phthalic anhydride from naphthalene is very slight even under very vigorous oxidation conditions, and also since no maleic acid production has been observed from the oxidation of benzene in the presence of molybdenum oxide as a catalyst. The specific catalytic action of molybdenum oxide appears to be essentially different from that of vanadium oxide which exerts a pronounced splitting action on the benzene nucleus, whether it be benzene, toluene, naphthalene, anthracene, phenanthrene, etc.

I have found that uranium oxide as a catalyst also differs from vanadium oxide in that the intermediate phthalic anhydride formation is practically negligible. The production of anthraquinone, however, is relatively low with this catalyst as the majority of the activity of the catalyst is exerted in the direction of complete combustion, which makes the control of the catalyst temperature practically impossible.

The results with tungstic oxide were found to be almost identical with those obtained with molybdenum, as were also those of tantalum oxide, except that the latter oxide gave a slightly higher anthraquinone production, but as in the case with molybdenum oxide, excessively high catalysts temperatures were necessary, thus limiting their commercial possibilities.

I have also investigated the catalytic properties of numerous other metallic oxides, including those of chromium, manganese, cobalt, nickel, tin, thorium, zirconium, titanium, copper, cerium and bismuth and have found that although anthraquinone was formed in all cases, in more or less varying degree, it was relatively low when compared with the amount of anthracene undergoing complete combustion.

Form the preceding discussion it is seen that a commercially successful catalyst for producing anthraquinone from anthracene should possess certain definite properties, which are as follows:—(1) It should form little or no phthalic anhydride; (2) it should produce a minimum amount of complete combustion, (these two conditions facilitate the control of the catalyst temperature and favor large anthraquinone yields); (3) it should produce a relatively large anthraquinone production; and, (4) it should function satisfactorily at a temperature low enough to prevent undue pyrogenetic decomposition of the anthracene and undue strain on the apparatus. The oxides of the metals enumerated above, when used singly, all possess most of these disadvantages to a more or less marked degree.

I have found, however, that very greatly augmented productions of anthraquinone with relatively very small complete combustions and phthalic anhydride productions can be realized under conditions which are highly satisfactory commercially, if proper mixtures of the oxides of these various metals are employed instead of the individual oxides of these metals, and this constitutes the new and useful improvements in the production of anthraquinone of which this is a specification.

I have investigated a number of catalysts consisting of mixtures of the oxides of these various previously mentioned metals and have found that the metallic oxide components in such mixed catalysts exert a profound and unexpected influence on each other. For example, if only a relatively small amount of molybdenum oxide is added to vanadium oxide, I have found that a very much higher yield of anthraquinone is obtained than with either of the oxides when used alone, with a relatively very small excess combustion and a quite small phthalic anhydride production. It was found, however, that the catalyst temperature with this mixture had to be somewhat increased over that employed with vanadium oxide. It appears as though molybdenum oxide possesses not only a powerful depressing action on the vanadium oxide, but also the ability to almost completely negative the strong tendency of the vanadium oxide to spilt open the benzene nucleus. An investigation of the relative amounts of vanadium and molybdenum oxide indicates that the most satisfactory proportion is a mixture containing approximately 15% molybdenum oxide and 85% vanadium oxide.

Other mixed catalysts which were found very successful were tantalum oxide uranium oxide mixtures with the uranium oxide predominating, and uranium oxide molybdenum oxide mixtures in which the uranium oxide predominated. In the case of the latter mixture it was found that although large anthraquinone productions were obtained with relatively quite low complete combustions, a measurable phthalic anhydride production was also noticed, which I found could be almost entirely eliminated by the addition of small amounts of the oxides of manganese, copper, or zirconium. Thus, by employing mixtures of the oxides of the metals mentioned previously and by adjusting the relative proportions of the component metallic oxides present, I have been able to obtain yields of anthraquinone far in excess of those procurable from these oxides when used singly, and in addition these yields were obtained under running conditions which I have found to be entirely satisfactory from the standpoint of the commercial production of anthraquinone.

Although several mixed oxide catalysts have thus been described, it is not the intention to be limited to these specific examples as many other mixtures containing two or more of the oxides previously enumerated which I have investigated can be prepared. In choosing these oxides to constitute the mixed catalyst it is essential, however, that they all should catalyze the oxidation of anthracene to anthraquinone.

In the preparation of these mixed catalysts, it is preferable that the component metallic oxides be in the most minutely divided state possible and in intimate contact with each other in order to secure the maximum advantage of the mixed catalyst. The preparation of the catalyst can be accomplished by starting with a solution containing the salts of the metals, the oxides of which metals are desired in the finished catalysts, and which metallic salts on ignition leave only the oxides of the metals, or it is also possible to use a water suspension of the oxides, or hydroxides of the metals. However, I have obtained the most satisfactory results by employing a solution of the complex organic acid compounds of the metals, as described in my co-pending application, Serial No. 513,111. The carrier, which may consists of crushed pumice or other suitable powdered, granulated or fibrous material, which is chemically inactive and acts merely as a mechanical distributor, may then be added to the prepared solution or water suspension of the metallic compounds and the whole evaporated to dryness while being stirred, after which it is ignited in air or other gases or in the presence of the anthracene oxygen-containing gas mixture to be employed in the catalysis.

My invention will be further explained in connection with the following example which is given for illustrative purposes. It is not intended to limit the procedure to the exact details given, as the process can be varied over wide limits, both in the choice of the conditions and also in the composition of the catalyst, without departing from the spirit and scope of the invention.

A mixture of approximately 15 parts of air to 1.0 part of anthracene vapor is passed through a catalyst consisting of crushed pumice impregnated with a mixture of 89% uranium oxide and 11% of molybdenum oxide held at a temperature of 475° C. and maintaining a time of contact between the reacting gases and the catalyst of about 0.5 second. It is preferable to introduce the catalyst or the carrier containing the same into tubes, containers or other confined space, through which the reacting gases are passed. The products of the reaction, together with the very small amount of unchanged anthracene, are then condensed and the anthracene separated by any of the well known methods, either chemical or physical in nature, which recovered anthracene may be recharged again. A production of about 85 pounds of anthraquinone per 100 pounds of anthracene charged into the system with about 10% of complete combustion is obtained with a negligible production of phthalic anhydride. A very small amount of unchanged anthracene is also obtained with the anthraquinone. It is also possible because of the great difference in the relative vapor pressures of anthracene and anthraquinone to maintain the condenser at such a temperature that the anthraquinone will condense out in very pure form while the anthracene remains in the vapor form which, after being enriched with oxygen or oxygen-containing gas and being fortified with additional anthracene vapor, if desirable, can be immediately passed into another anthracene converter similar to the first and arranged in series with the first.

It will be evident that the various conditions of the reaction as stated above are capable of wide variation. Among these conditions may be mentioned the temperature and pressure at which the reaction is carried out, as, for example, the reaction may be carried out at atmospheric pressure or at increased or diminished pressure; the time of contact of the reacting gases with the catalyst; the proportion of catalyst to the reacting gases; the relative proportions of anthracene to oxygen-containing gas, which may consist of air, oxygen, or ozone, or a mixture of any or all of these or other gases which contain free oxygen. These conditions are more or less dependent on each other. Furthermore, much variation exists in the choice of the mixed catalyst, which in turn will necessitate variation or adjustment of the other conditions enumerated above, in order to utilize to the greatest advantage the improvement in the composition of the catalyst.

Instead of employing relatively pure anthracene, I have found that relatively impure anthracene, which contains considerable carbazole, phenanthrene, and other materials usually associated with anthracene, can be subjected to catalysis by these mixed oxides with similar gratifying results. It is found that the greater part of these impurities undergo preferentially complete combustion with the mixed catalysts herein described, and the products of combustion can be readily separated from the anthraquinone. In the claims the term anthracene includes both the pure and impure materials.

I claim:

1. The process of producing anthraquinone, which comprises passing anthracene in the vapor phase and an oxygen-containing gas into contact with a mixture of the oxides of uranium and molybdenum in approximately the proportions of 8 to 1.

2. The process of producing anthraquinone, which comprises passing anthracene in the vapor phase and an oxygen containing gas into contact with a catalyst comprising oxides of uranium and molybdenum at a temperature of about 475° C.

3. The process of producing anthraquinone which comprises passing anthracene in the vapor phase and an oxygen-containing gas into contact with a catalyst comprising oxides of two metals of the fifth and sixth groups of the periodic system and the oxide of a metal of another group.

4. The process of producing anthraquinone, which comprises passing anthracene in the vapor phase and an oxygen containing gas into contact with a catalyst comprising oxides of uranium and molybdenum, the oxide of uranium predominating.

5. The process of producing anthraquinone, which comprises passing anthracene in the vapor phase and an oxygen containing gas into contact with a catalyst comprising oxides of uranium and molybdenum at a temperature of about 475° C., the mean time of contact between the anthracene vapor and the oxygen-containing gas being maintained at about five-tenths of one second.

6. The process of producing anthraquinone, which comprises passing anthracene in the vapor phase and an oxygen containing gas into contact with a catalyst comprising oxides of uranium and molybdenum, the mean time of contact between the anthracene vapor and the oxygen-containing gas being maintained at about five-tenths of one second.

In testimony whereof I affix my signature.

AUGUSTUS E. CRAVER.